US011902062B2

(12) United States Patent
Banin et al.

(10) Patent No.: US 11,902,062 B2
(45) Date of Patent: Feb. 13, 2024

(54) APPARATUS AND METHOD FOR TRANSMITTING A BIT IN ADDITION TO A PLURALITY OF PAYLOAD DATA SYMBOLS OF A COMMUNICATION PROTOCOL, AND APPARATUS AND METHOD FOR DECODING A DATA SIGNAL

(71) Applicant: Intel Corporation, Santa Clara,, CA (US)

(72) Inventors: Elan Banin, Raanana (IL); Rotem Banin, Even-Yehuda (IL); Ofir Degani, Nes-Ammim (IL); Eytan Mann, Modiin (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/754,311

(22) PCT Filed: Dec. 23, 2019

(86) PCT No.: PCT/US2019/068224
§ 371 (c)(1),
(2) Date: Mar. 30, 2022

(87) PCT Pub. No.: WO2021/133370
PCT Pub. Date: Jul. 1, 2021

(65) Prior Publication Data
US 2022/0345338 A1 Oct. 27, 2022

(51) Int. Cl.
*H03K 9/08* (2006.01)
*H04L 25/49* (2006.01)

(52) U.S. Cl.
CPC ................. *H04L 25/4902* (2013.01)

(58) Field of Classification Search
CPC ............. H04L 12/2825; H04L 12/4013; H04L 2012/40215; H04L 1/20; H04B 3/54; H04B 3/544; H04W 8/00; H04W 52/00
(Continued)

(56) References Cited

U.S. PATENT DOCUMENTS 6,064,697 A 5/2000 Yoshikawa
10,783,601 B1 * 9/2020 Rodriguez ............ G06T 1/0028
(Continued)

FOREIGN PATENT DOCUMENTS

EP 2339803 A1 6/2011
WO 2019055894 A1 3/2019

OTHER PUBLICATIONS

Rashdan Mostafa et al: "Differential Time Signaling Data-Link Architecture", Journal of Signal Processing Systems, vol. 70, No. 1, Jan. 1, 2013 (Jan. 1, 2013), pp. 21-37, XP055800644, ISSN: 1939-8018, DOI: 10.1007/s11265-012-0656-8 retrieved from the Internet: URL:https://link.springer.com/content/pdf/10.1007/s11265-012-0656-8.pdf.

*Primary Examiner* — Khai Tran
(74) *Attorney, Agent, or Firm* — 2SPL Patentanwälte PartG mbB; Kieran O'Leary

(57) ABSTRACT

An apparatus for transmitting a bit in addition to a plurality of payload data symbols of a communication protocol is provided. The apparatus comprises an input interface configured to receive information about a bit value of the bit. Further, the apparatus comprises a transmission circuit configured to, if the bit value is a first value, transmit the plurality of payload data symbols at predetermined positions in a data signal as pulses of variable pulse length. The respective pulse length of each of the pulses is selected based on the symbol value of the payload data symbol represented by the respective pulse. If the bit value is a second value, the transmission circuit is configured to trans-
(Continued)

mit a pulse exhibiting a pulse length being longer than a maximum payload data symbol pulse length defined in the communication protocol at the predetermined position of the pulse for the d-th payload data symbol of the plurality of payload data symbols, $d=k+i$ if $k+i \leq z$. $d=([k+i] \bmod z)$ if $k+i>z$. k is the symbol value of the i-th payload data symbol of the plurality of payload data symbols, z is the number of possible symbol values of the payload data symbols defined in the communication protocol, and $1 \leq i \leq z$.

23 Claims, 3 Drawing Sheets

(58) Field of Classification Search
USPC .................................................. 375/238, 130
See application file for complete search history.

(56) References Cited

U.S. PATENT DOCUMENTS

| | | | |
|---|---|---|---|
| 2010/0316166 A1* | 12/2010 | Van Thillo | H04L 25/0244 |
| | | | 375/308 |
| 2013/0197920 A1* | 8/2013 | Lesso | H04L 25/4902 |
| | | | 704/500 |
| 2015/0200706 A1* | 7/2015 | Bottazzi | H04B 1/7073 |
| | | | 375/140 |
| 2017/0026166 A1 | 1/2017 | Barrenscheen | |
| 2018/0039598 A1 | 2/2018 | Mishra et al. | |
| 2019/0199451 A1 | 6/2019 | Krall et al. | |

* cited by examiner

100

200

APPARATUS AND METHOD FOR TRANSMITTING A BIT IN ADDITION TO A PLURALITY OF PAYLOAD DATA SYMBOLS OF A COMMUNICATION PROTOCOL, AND APPARATUS AND METHOD FOR DECODING A DATA SIGNAL

FIELD

The present disclosure relates to data transmission. In particular, examples relate to an apparatus and a method for transmitting a bit in addition to a plurality of payload data symbols of a communication protocol. Further, examples relate to an apparatus and a method for decoding a data signal.

BACKGROUND

In communication protocols such as the STEP protocol, data symbols are transmitted as pulses of different durations. As a consequence, the instantaneous data rate depends on the data itself and is therefore non-uniform. In order to ensure an average data rate, intervention is desired. For example, the data may be flipped (inverted). Data flipping needs to be reliably signaled by the transmit side to the receive side.

Further, transmitting additional data for, e.g., a Cyclic Redundancy Check (CRC), an Error Correcting Code (ECC), control bits or physical layer control bits may be desired.

The additional data should be transmitted in a reliable manner without adding extra symbols to the communication protocol.

Hence, there may be a desire for improved data transmission.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly nor implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Figure 1:
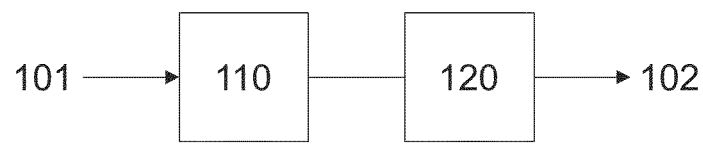
FIG. 1 illustrates an example of an apparatus for transmitting a bit in addition to a plurality of payload data symbols of a communication protocol.

FIG. 1 illustrates an apparatus 100 for transmitting a bit in addition to a plurality of payload data symbols of a communication protocol.

The apparatus 100 comprises an input interface 110 configured to receive information 101 about a bit value of the bit. For example, the information 101 may indicate whether the bit value of the bit is 0 or 1.

Additionally, the apparatus 100 comprises a transmission circuit 120 configured to generate a data signal 102. The transmission circuit 120 may, e.g., be a digital-to-analog converter.

If the bit value is a first value (e.g. 0), the transmission circuit 120 is configured to transmit the plurality of payload data symbols at predetermined positions in the data signal 102 as pulses of variable pulse length. For example, a first payload data symbol of the plurality of payload data symbols is transmitted as a pulse at a first predetermined position in the data signal 102, a second payload data symbol of the plurality of payload data symbols is transmitted as a pulse at a second predetermined position in the data signal 102, etc. The respective pulse length of each of the pulses is selected based on the symbol value of the payload data symbol represented by the respective pulse. The communication protocol defines a respective pulse length for each possible symbol value of a payload data symbol. In other words, the payload data symbols are transmitted one by one in the data signal 102 as pulses of different durations.

If the bit value is a second value (e.g. 1), the transmission circuit 120 is configured to transmit a pulse exhibiting a pulse length being longer than a maximum payload data symbol pulse length defined in the communication protocol at the predetermined position of the pulse for the d-th payload data symbol of the plurality of payload data symbols. The variable d=k+i if k+i≤z. Further, the variable d=([k+i] mod z) if k+i>z. k is the (integer) symbol value of the i-th payload data symbol of the plurality of payload data symbols. z is the number of possible symbol values of the payload data symbols defined in the communication protocol. For example, z−1 may be the maximum symbol value for any payload data symbol defined in the communication protocol. i may be arbitrarily selected and be any integer number that fulfills the following mathematical expression:

1≤i≤z

In other words, i may be an integer number that is selected from the value range [1; z]. For example, i may be selected prior to transmitting the plurality of payload data symbols.

If the bit value is the second value and if k=0, the transmission circuit 120 is further configured to transmit the payload symbols of the plurality of payload data symbols other than the d-th payload data symbol as pulses of variable pulse length at their predetermined positions.

If the bit value is the second value and if k>0, the transmission circuit 120 is further configured to transmit a pulse exhibiting a pulse length corresponding to the symbol value of the d-th payload data symbol at the predetermined position of the pulse for the i-th payload data symbol of the plurality of payload data symbols. Additionally, the transmission circuit 120 is configured to transmit the payload symbols of the plurality of payload data symbols other than the d-th payload data symbol and the i-th payload data symbol as pulses of variable pulse length at their predetermined positions.

The apparatus 100 may allow to transmit an additional bit without adding extra symbols to the communication protocol. Due to using the pulse length being longer than the maximum payload data symbol pulse length defined in the communication protocol for signaling the additional bit, the transmission of the additional bit may be reliable. A pulse exhibiting a pulse length longer than the maximum payload data symbol pulse length defined in the communication protocol may also be referred to as a "long pulse". In other words, a long pulse is used for signaling an extra bit in a data structure (e.g. a data packet). One of the payload data symbols is effectively overwritten in order to signal that the bit exhibits the second bit value (e.g. signal extra bit==1). The position of the long pulse in the data signal 102 is chosen according to the erased data. The receive side may accordingly recover the removed data symbol. Using a long pulse instead of introducing additional symbols to the communication protocol may improve the data rate of the transmission link used for transmitting the data signal 102 (even though a shorter pulse is replaced by the long pulse). Further, the additionally transmitted bit may be transmitted natively reliable as the long pulse is used. Therefore, no replication of the bit needs to be sent in order to guarantee its proper reception.

In order to illustrate the above transmission scheme, a few non-limiting examples will be given in the following:

In the first example, it is assumed that each payload data symbol can have two different symbol values 0 and 1 (i.e. z=2). In other words, one bit of information can be transmitted per payload data symbol. In order to transmit one additional bit (i.e. one extra bit), two payload data symbols are used. If the bit value of the additional bit is 0, the payload data symbols are transmitted at their respective regular positions (i.e. the data is transmitted as is). If the bit value of the additional bit is 1, the first payload data symbol is overwritten (i.e. i is selected to be 1). In other words, the first data bit represented by the first payload data symbol is removed. The position of the long pulse is chosen according to the symbol value of the first payload data symbol. If the first data bit (i.e. the symbol value of the first payload data symbol) is 0, the long pulse is transmitted at the first predetermined position in the data signal. If the first data bit (i.e. the symbol value of the first payload data symbol) is 1, the long pulse is transmitted at the second predetermined position in the data signal 102. This is summarized in the following table:

TABLE 1

| symbol value of 1$^{st}$ payload data symbol | symbol value of 2$^{nd}$ payload data symbol | bit value of additional bit | output pulse length at 1$^{st}$ predetermined position | output pulse length at 2$^{nd}$ predetermined position |
|---|---|---|---|---|
| 0 | 0 | 0 | 0 | 0 |
| 0 | 1 | 0 | 0 | 1 |
| 1 | 0 | 0 | 1 | 0 |
| 1 | 1 | 0 | 1 | 1 |
| 0 | 0 | 1 | L | 0 |
| 0 | 1 | 1 | L | 1 |
| 1 | 0 | 1 | 0 | L |
| 1 | 1 | 1 | 1 | L |

For example, in line 2 of Table 1, the bit value of the additional bit is 0. Therefore, the data is transmitted as it is. Since the symbol value of the first payload symbol is 0, the pulse at the first predetermined position in the data signal 102 exhibits the pulse length defined in the communication protocol for the symbol value 0. Accordingly, since the symbol value of the second payload symbol is 1, the pulse at the second predetermined position in the data signal 102 exhibits the pulse length defined in the communication protocol for the symbol value 1.

In line 9 of Table 1, the bit value of the additional bit is 1. Therefore, a long pulse is transmitted. Since i=1 and since the symbol value k of the i-th payload data symbol (i.e. the first payload data symbol) is 1, the variable d=k+i=2≤z=2. Therefore, the long pulse (denoted as L in Table 1) is transmitted at the position k+i=1+1=2 by the transmission circuit 120. Further, since k=1>0, the transmission circuit 120 is configured to transmit the symbol value of the d=2-th payload data symbol at the predetermined position of the pulse for the i=1-th payload data symbol. That is, the symbol value 1 of the second payload data symbol is transmitted by a pulse of corresponding pulse length at the first predetermined position in the data signal 102.

In a second example, it is assumed that each payload data symbol can have four different symbol values 0, 1, 2 and 3 (i.e. z=4). In other words, two bits of information can be transmitted per payload data symbol. In order to transmit one additional bit (i.e. an extra bit), four payload data symbols are needed. The logic is the same as in the above example. That is, if the bit value of the additional bit is 0, the payload data symbols are transmitted at their respective regular positions (i.e. the data is transmitted as is). If the bit value of the additional bit is 1, the first payload data symbol is overwritten (i.e. i is selected to be 1). The position of the long pulse is chosen according to the symbol value of the first payload data symbol. This is summarized in the following table:

TABLE 2

| symbol value of $1^{st}$ payload data symbol | symbol value of $2^{nd}$ payload data symbol | symbol value of $3^{rd}$ payload data symbol | symbol value of $4^{th}$ payload data symbol | bit value of additional bit | output pulse length at $1^{st}$ predetermined position | output pulse length at $2^{nd}$ predetermined position | output pulse length at $3^{rd}$ predetermined position | output pulse length at $4^{th}$ predetermined position |
|---|---|---|---|---|---|---|---|---|
| s1 | s2 | s3 | s4 | 0 | s1 | s2 | s3 | s4 |
| 0 | s2 | s3 | s4 | 1 | L | s2 | s3 | s4 |
| 1 | s2 | s3 | s4 | 1 | s2 | L | s3 | s4 |
| 2 | s2 | s3 | s4 | 1 | s3 | s2 | L | s4 |
| 3 | s2 | s3 | s4 | 1 | s4 | s2 | s3 | L |

In Table 2, the symbol values s1, . . . , s4 may be any value from 0, . . . , 3.

For example, in line 1 of Table 2, the bit value of the additional bit is 0. Therefore, the data is transmitted as it is. Since the symbol value of the first payload symbol is s1 (e.g. 0), the pulse at the first predetermined position in the data signal 102 exhibits the pulse length defined in the communication protocol for the symbol value s1. Accordingly, since the symbol value of the second payload symbol is s2 (e.g. 1), the pulse at the second predetermined position in the data signal 102 exhibits the pulse length defined in the communication protocol for the symbol value s2. Since the symbol value of the third payload symbol is s3 (e.g. 2), the pulse at the third predetermined position in the data signal 102 exhibits the pulse length defined in the communication protocol for the symbol value s3. Since the symbol value of the fourth payload symbol is s4 (e.g. 3), the pulse at the fourth predetermined position in the data signal 102 exhibits the pulse length defined in the communication protocol for the symbol value s4.

In line 5 of Table 1, the bit value of the additional bit is 1. Therefore, a long pulse. Since i=1 and since the symbol value k of the i-th payload data symbol (i.e. the first payload data symbol) is 3, the variable d=k+i=4≤z=4. Therefore, the long pulse (denoted as L in Table 2) is transmitted at the position k+i=3+1=4 by the transmission circuit 120. Further, since k=3>0, the transmission circuit 120 is configured to transmit the symbol value of the d=4-th payload data symbol at the predetermined position of the pulse for the i=1-th payload data symbol. That is, the symbol value s4 of the fourth payload data symbol is transmitted at the first predetermined position in the data signal 102.

In the two above examples, the number of payload data symbols required for transmitting one extra-bit is equal to the number of possible values for each payload data symbol (AKA symbol alphabet). In other words, the number of the plurality of transmitted payload data symbols is equal to the number of possible symbol values of the payload data symbols defined in the communication protocol. If the extra-bit=0, the data is transmitted as-is. If the extra-bit=1, the first data-symbol (s1) is effectively removed. If s1=0, a long pulse is transmitted in the first position. If s1=P-1, a long pulse is transmitted in the P-th position and sK is transmitted in the first position.

In a third example, it is again assumed that each payload data symbol can have four different symbol values 0, 1, 2 and 3 (i.e. z=4). The logic is similar to the above example. If the bit value of the additional bit is 0, the payload data symbols are transmitted at their respective regular positions (i.e. the data is transmitted as is). If the bit value of the additional bit is 1, the fourth payload data symbol is overwritten (i.e. i is selected to be 4). The position of the long pulse is chosen according to the symbol value of the fourth payload data symbol. This is summarized in the following table:

TABLE 3

| symbol value of $1^{st}$ payload data symbol | symbol value of $2^{nd}$ payload data symbol | symbol value of $3^{rd}$ payload data symbol | symbol value of $4^{th}$ payload data symbol | bit value of additional bit | output pulse length at $1^{st}$ predetermined position | output pulse length at $2^{nd}$ predetermined position | output pulse length at $3^{rd}$ predetermined position | output pulse length at $4^{th}$ predetermined position |
|---|---|---|---|---|---|---|---|---|
| s1 | s2 | s3 | s4 | 0 | s1 | s2 | s3 | s4 |
| s1 | s2 | s3 | 0 | 1 | s1 | s2 | s3 | L |
| s1 | s2 | s3 | 1 | 1 | L | s2 | s3 | s1 |
| s1 | s2 | s3 | 2 | 1 | s1 | L | s3 | s2 |
| s1 | s2 | s3 | 3 | 1 | s1 | s2 | L | s3 |

In line 1 of Table 3, the bit value of the additional bit is 0. Therefore, the data is transmitted as it is like in example 2 (see also Table 2).

In line 5 of Table 3, the bit value of the additional bit is 1. Therefore, a long pulse is transmitted. Since i=4 and since the symbol value k of the i-th payload data symbol (i.e. the fourth payload data symbol) is 3, the variable d=k+i=7>z=4. Therefore, the long pulse (denoted as L in Table 2) is transmitted at the position [k+i] mod z=[3+4] mod 4=3 by the transmission circuit 120. Further, since k=3>0, the transmission circuit 120 is configured to transmit the symbol value of the d=3-th payload data symbol at the predetermined position of the pulse for the i=4-th payload data symbol. That is, the symbol value s3 of the third payload data symbol is transmitted at the fourth predetermined position in the data signal 102.

The above described transmission technique may, e.g., be used in the STEP protocol. Details of the STEP protocol can be found in International Patent Application No. PCT/US2018/051291, the disclosure of which is hereby incorporated in its entirety by reference. For example, the transmission circuit 120 may be configured to generate the data signal 102 compliant to the STEP protocol. Therefore, a sum of the pulse lengths of two directly succeeding pulses in the data signal 102 that represent payload data symbols may be lower than $10^{-7}$ s, $10^{-8}$ s, $10^{-9}$ s, $10^{-10}$ s, $10^{-11}$ s, or $10^{-12}$ s. Further, the transmission circuit 120 may be configured to transmit two directly succeeding payload data symbols of the plurality of payload data symbols as a sequence of a high pulse and a low pulse for compliance to the STEP protocol.

The foregoing sections focused on the transmit side. In the following, the receive side will be described in detail. In particular, it will be described how the data signal 102 is decoded.

Figure 2:
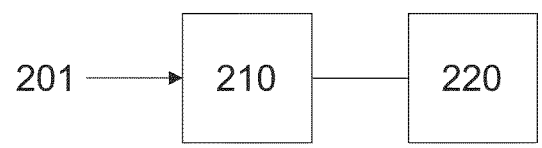
FIG. 2 illustrates an example of an apparatus for decoding a data signal.

FIG. 2 illustrates an apparatus 200 for decoding a data signal 201 comprising a plurality of pulses of variable pulse length at predetermined positions. The apparatus 200 comprises an input interface 210 configured to receive the data signal 201.

Further, the apparatus 200 comprises a demodulation circuit 220 for demodulating the data signal 201.

If the pulse lengths of the plurality of pulses at the predetermined positions are not longer than the maximum payload data symbol pulse length defined in the communication protocol, the demodulation circuit 220 is configured to determine that a bit value of a bit is a first value (e.g. 0).

If the pulse lengths of the plurality of pulses at the predetermined positions are not longer than the maximum payload data symbol pulse length defined in the communication protocol, the demodulation circuit 220 is further configured to determine a respective symbol value for each payload data symbol of a plurality of payload data symbols based on the respective pulse length of a respective pulse of the plurality of pulses. For example, the symbol value of a first payload data symbol of the plurality of payload data symbols may be determined based on the pulse length of the pulse at a first predetermined position in the data signal 102, the symbol value of a second payload data symbol of the plurality of payload data symbols may be determined based on the pulse length of the pulse at a second predetermined position in the data signal 102, etc.

If the pulse length of one of the plurality of pulses at the predetermined positions is longer than the maximum payload data symbol pulse length defined in the communication protocol, the demodulation circuit 220 is configured to determine that the bit value of the bit is a second value (e.g. 1).

If the pulse length of one of the plurality of pulses at the predetermined positions is longer than the maximum payload data symbol pulse length defined in the communication protocol, the demodulation circuit 220 is further configured to determine a position m of the pulse with the pulse length being longer than the maximum payload data symbol pulse length defined in the communication protocol among the plurality of pulses in the data signal 102. Additionally, the demodulation circuit 220 is configured to determine that a symbol value of an i-th payload data symbol of the plurality of payload data symbols is ([m−i] mod z). As described above, z is the number of possible symbol values of the payload data symbols defined in the communication protocol, and i may be arbitrarily selected and fulfill the following mathematical expression:

$$1 \leq i \leq z$$

If m=i, the demodulation circuit 220 is further configured to determine a respective symbol value for the other payload data symbols of the plurality of payload data symbols based on the respective pulse length of one of the pulses of the plurality of pulses other than the m-th pulse of the plurality of pulses. For example, the demodulation circuit 220 may determine the symbol value of the (m+1)-th payload data symbol of the plurality of payload data symbols based on the pulse length of the pulse at the (m+1)-th predetermined position in the data signal 201.

If m≠i, the demodulation circuit 220 is further configured to determine the symbol value of the m-th payload data symbol of the plurality of payload data symbols based on the pulse length of the i-th pulse of the plurality of pulses. Additionally, the demodulation circuit 220 is configured determine a respective symbol value for the payload data symbols of the plurality of payload data symbols other than the i-th payload data symbol and the m-th payload data symbol based on the respective pulse length of one of the pulses of the plurality of pulses other than the i-th pulse and the m-th pulse of the plurality of pulses. For example, the demodulation circuit 220 may determine the symbol value of the b-th payload data symbol (b being an integer, b≠i and b≠m) of the plurality of payload data symbols based on the pulse length of the pulse at the b-th predetermined position in the data signal 201.

The apparatus 200 may allow to reliably decode the plurality of payload data symbols and the additional bit in the data signal 201.

In order to illustrate the above decoding scheme, it will be referred to the above first to third examples:

Referring to the first example, each of the two output pulses in line 1 of Table 1 exhibits a pulse length corresponding a symbol value of a payload data symbol. Therefore, the two pulses are not longer than the maximum payload data symbol pulse length defined in the communication protocol. As a consequence, the demodulation circuit 220 determines that the bit value of the additional bit is 0 and decodes the data as is. The symbol value of the first payload data symbol is determined to be 0 as the pulse length of the first pulse corresponds to symbol value 0. Similarly, the symbol value of the second payload data symbol is determined to be 0 as the pulse length of the second pulse corresponds to symbol value 0.

In line 9 of Table 1, the second pulse is the long pulse. Therefore, the second pulse is longer than the maximum payload data symbol pulse length defined in the communication protocol. As a consequence, the demodulation circuit 220 determines that the bit value of the additional bit is 1. The decoding of the payload symbols is as follows: First, the demodulation circuit 220 determines that the position of the long pulse is m=2. Since i=1 in the example of Table 1 (see above), the symbol of the i=1-th payload data symbol is determined as ([m−i] mod z)=([2−1] mod 2)=1. Further, since m=2≠i=1, the symbol value of the m=2-th payload data symbol is determined based on the pulse length of the i=1-th pulse, i.e. the first pulse. Since the pulse length of the first pulse corresponds to symbol value 1, the symbol value of the second payload data symbol is determined to be 1. It is evident that the determined symbol values for the two transmitted payload data symbols are determined correctly in addition to the bit value of the additional bit.

In the example of Table 2, if there is no long pulse, the data encoded in the first pulse is the symbol value of the first payload data symbol and the data encoded in second pulse is the symbol value of the second payload data symbol. If the first pulse is the long pulse, the first payload data symbol exhibits the symbol value 0 and the data encoded in second pulse is the symbol value of the second payload data symbol. To the contrary, if the second pulse is the long pulse, the first payload data symbol exhibits the symbol value 1 and the data encoded in first pulse is the symbol value of the second payload data symbol.

Referring to the second example, each of the two output pulses in line 1 of Table 2 exhibits a pulse length corresponding a symbol value of a payload data symbol. Therefore, the four pulses are not longer than the maximum payload data symbol pulse length defined in the communication protocol. As a consequence, the demodulation circuit 220 determines that the bit value of the additional bit is 0 and decodes the data as is. The symbol value of the first payload data symbol is determined to be s1 as the pulse length of the first pulse corresponds to symbol value s1. Similarly, the symbol value of the second payload data symbol is determined to be s2 as the pulse length of the second pulse corresponds to symbol value s2, etc.

In line 5 of Table 2, the fourth pulse is the long pulse. Therefore, the fourth pulse is longer than the maximum payload data symbol pulse length defined in the communication protocol. As a consequence, the demodulation circuit 220 determines that the bit value of the additional bit is 1. The decoding of the payload symbols is as follows: First, the demodulation circuit 220 determines that the position of the long pulse is m=4. Since i=1 in the example of Table 2 (see above), the symbol of the i=1-th payload data symbol is determined as ([m−i] mod z)=([4−1] mod 4]=3. Further, since m=4≠i=1, the symbol value of the m=4-th payload data symbol is determined based on the pulse length of the i=1-th pulse, i.e. the first pulse. Since the pulse length of the first pulse corresponds to symbol value s4, the symbol value of the second payload data symbol is determined to be s4. The symbol values for the payload data symbols other than the i=1-th payload data symbol and the m=4-th payload data symbol, i.e. the second and the third payload data symbol, are determined by the demodulation circuit 220 based on the pulse lengths of the pulses other than the i=1-th pulse and the m=4-th pulse. The pulse length of the second pulse corresponds to symbol value s2, so that the symbol value of the second payload data symbol is determined to be s2. The pulse length of the third pulse corresponds to symbol value s3, so that the symbol value of the third payload data symbol is determined to be s3.

Referring to the third example, each of the two output pulses in line 1 of Table 3 exhibits a pulse length corresponding a symbol value of a payload data symbol. The encoding result is therefore the same as for the second example (see above).

In line 5 of Table 3, the third pulse is the long pulse. Therefore, the third pulse is longer than the maximum payload data symbol pulse length defined in the communication protocol. As a consequence, the demodulation circuit 220 determines that the bit value of the additional bit is 1. The decoding of the payload symbols is as follows: First, the demodulation circuit 220 determines that the position of the long pulse is m=3. Since i=4 in the example of Table 3 (see above), the symbol value of the i=4-th payload data symbol is determined as ([m−i] mod z)=([3−4] mod 4]=3. Further, since m=3≠i=4, the symbol value of the m=3-th payload data symbol is determined based on the pulse length of the i=4-th pulse, i.e. the fourth pulse. Since the pulse length of the fourth pulse corresponds to symbol value s3, the symbol value of the third payload data symbol is determined to be s3. The symbol values for the payload data symbols other than the i=4-th payload data symbol and the m=3-th payload data symbol, i.e. the first and the second payload data symbol, are determined by the demodulation circuit 220 based on the pulse lengths of the pulses other than the i=4-th pulse and the m=3-th pulse. The pulse length of the first pulse corresponds to symbol value s1, so that the symbol value of the first payload data symbol is determined to be s1. The pulse length of the second pulse corresponds to symbol value s2, so that the symbol value of the second payload data symbol is determined to be s2.

In the above examples, the number of the plurality of received pulses is equal to the number of possible symbol values of the payload data symbols defined in the communication protocol.

The above described encoding technique may, e.g., be used in the STEP protocol. In other words, the data signal 201 may be compliant to the STEP protocol. Therefore, a sum of the pulse lengths of two directly succeeding pulses in the data signal 201 that represent payload data symbols may be lower than $10^{-7}$ s, $10^{-8}$ s, $10^{-9}$ s, $10^{-19}$ s, $10^{-11}$ s, or $10^{-12}$ s. Further, two pulses of the plurality of pulses representing two directly succeeding payload data symbols of the plurality of payload data symbols may be a sequence of a high pulse and a low pulse.

In the above examples, in order to transmit an extra-bit, one of the data-symbols is replaced with a long pulse. This replacement signals to the receive side, e.g., "extra-bit==1". If there is no replacement (i.e. no long pulse), the receive side may, e.g., decode it as "extra-bit==0". According to the proposed scheme, the position of the long pulse is chosen such that it encodes the removed data-bit (payload data symbol).

Figure 3:
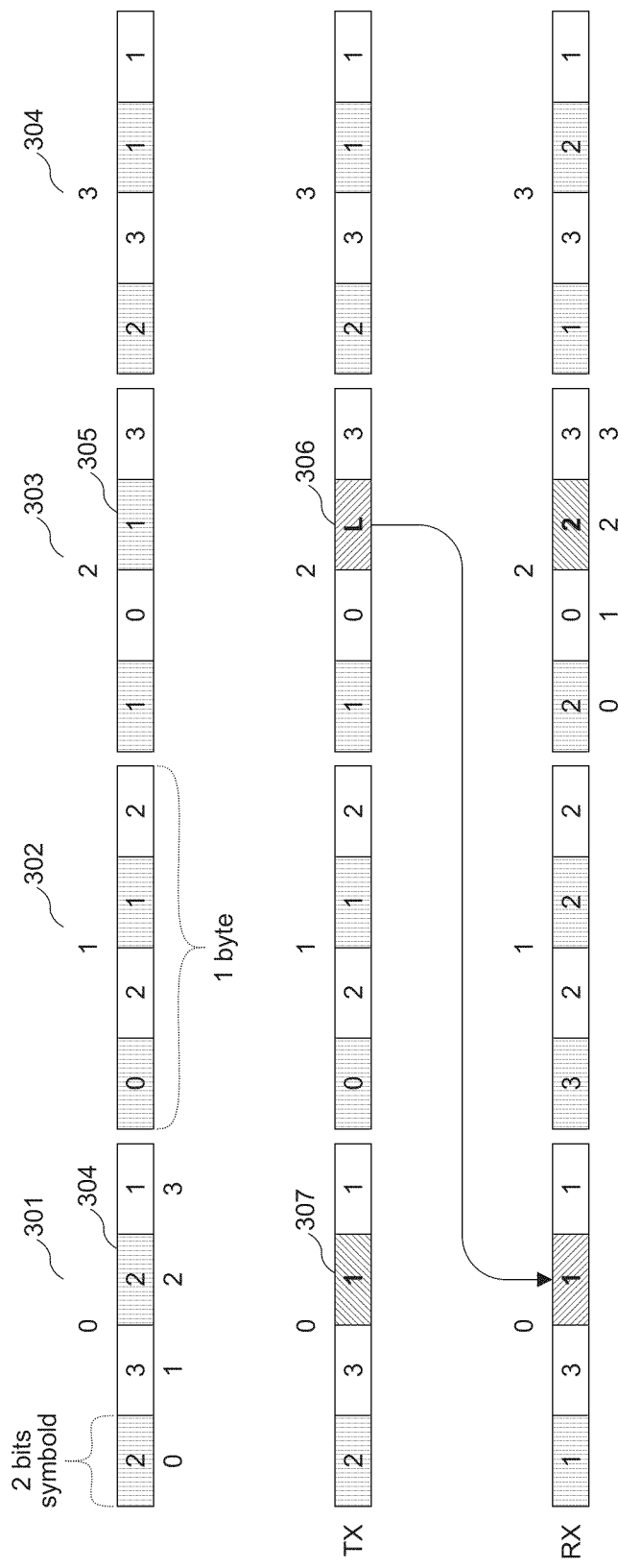
FIG. 3 illustrates an exemplary comparison of symbols to be transmitted, encoded symbols and decoded symbols.

FIG. 3 illustrates an exemplary data transmission using the STEP-lite protocol as communication protocol. STEP-lite uses payload data symbols with four possible values (0 to 3). FIG. 3 illustrates an example of flip-signaling using the proposed transmission scheme. In the upper part, four bytes 301, . . . , 304 that are to be transmitted are illustrated. Each byte comprises four symbols. The first two symbols of each byte are used for delimiters and cannot be replaced with long pulses. The third symbol and the fourth symbol of each byte are payload data symbols. In the example of FIG. 3, the respective symbol value of a symbol is indicated in the center of the symbol.

For example, the third symbol in one of the bytes 301, . . . , 304 may be used to signal a data flip on even (high) pulses. The fourth symbol in one of the bytes 301, . . . , 304 may be used to signal a data flip on the odd (low) pulses. That is, 4 bytes (i.e. 16 symbols) may be used to signal 2 extra-bits.

In FIG. 3, only the signaling of a data flip for the high pulses is illustrated. Since the bit value of the additional bit indicating the data flip is 1, a pulse exhibiting a pulse length being longer than a maximum payload data symbol pulse length defined in the STEP-lite protocol is transmitted at the predetermined position of the pulse for the d-th payload data symbol that is transmitted with a high pulse. In the example of FIG. 3, i=1 and the symbol value of the i=1-th payload data symbol 305 that is to be transmitted with a high pulse is k=2. Therefore, the long pulse is transmitted at the position of the d=k+i=2+1=3-th payload data symbol 306 that is to be transmitted with a high pulse.

The symbol values as transmitted via the length-variable pulses are shown in the middle part of FIG. 3. When comparing the symbol values in the upper part and the middle part of FIG. 3, it is evident that the pulse at the predetermined position 308 for the $3^{rd}$ payload data symbol that is to be transmitted with a high pulse is changed to the long pulse.

Further, a pulse exhibiting a pulse length corresponding to the symbol value of the d=3-th payload data symbol 306 is transmitted at the predetermined position 307 of the pulse for the i=1-th payload data symbol 305. The symbol value of the d=3-th payload data symbol 306 is 1 so that the symbol value 1 is transmitted for the d=3-th payload data symbol 306 at the predetermined position 307 of the pulse for the i=1-th payload data symbol 305.

In the lower part of FIG. 3, the resulting encoding at the receive side is illustrated.

The receive side determines that the long pulse is at the position m=3 and determines that the bit value of the additional bit indicating the data flip is 1, i.e. that a data flip is signaled.

Further, it determines that the symbol value of the i=1-th payload data symbol is ([m−i] mod z)=[3−1] mod 4=2 and performs the data flip (0<->3, 1<->2) indicated by the long pulse such that 1 is decoded as symbol value for the first payload data symbol 305 to be transmitted with a high pulse.

Similarly, the receive side determines the symbol value of the m=3-th payload data symbol based on the pulse length of the i=1-th pulse and performs the data flip (0<->3, 1<->2) indicated by the long pulse such that 2 is decoded as symbol value for the third payload data symbol 306 to be transmitted with a high pulse. The i-th pulse is of the same pulse type (here: high pulse) as the m-th pulse.

The symbol values for the payload data symbols of the bytes 303 and 304 that are to be transmitted with high pulses are determined based on the pulse lengths of the respective high pulse of the bytes 303 and 304, wherein the data flip (0<->3, 1<->2) is applied, such that the symbol value 2 is decoded for each of the bytes 303 and 304.

When comparing the upper part and the lower part of FIG. 3, it can be seen that the data flip is successfully applied to the symbols transmitted via the high pulses. The decoded symbol values for the low pulses are not data flipped since no long pulse is transmitted at a predetermined position of one of the low pulses.

As is evident from the above description, the proposed transmission schema may allow to reliably transmit an additional bit for indicating a data flip. Analogously, an additional bit for a CRC, an ECC, a control bit, a physical layer control bit etc. may be transmitted.

Figure 4:
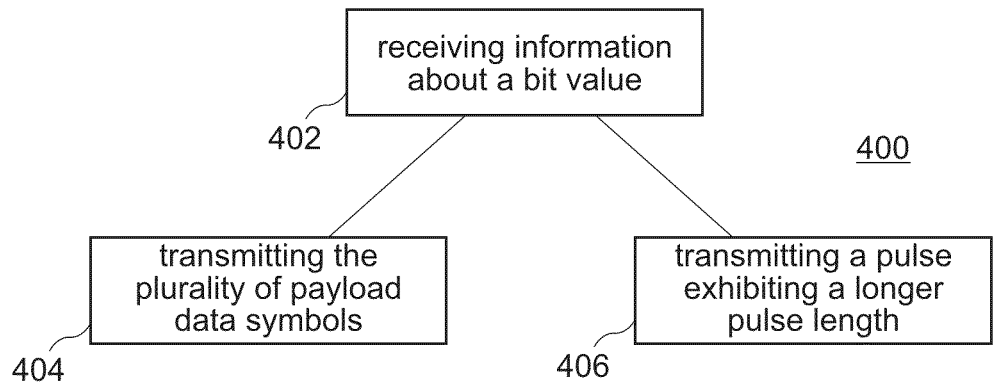
FIG. 4 illustrates a flowchart of an example of a method for transmitting a bit in addition to a plurality of payload data symbols of a communication protocol.

For further illustrating the data transmission described above, FIG. 4 illustrates a flowchart of a method 400 for transmitting a bit in addition to a plurality of payload data symbols of a communication protocol. The method 400 comprises receiving 402 information about a bit value of the bit. If the bit value is a first value, the method 400 comprises transmitting 404 the plurality of payload data symbols at predetermined positions in a data signal as pulses of variable pulse length. The respective pulse length of each of the pulses is selected based on the symbol value of the payload data symbol represented by the respective pulse. If the bit value is a second value, the method 400 comprises transmitting 406 a pulse exhibiting a pulse length being longer than the pulse length of any payload data symbol defined in the communication protocol at the predetermined position of the pulse for the d-th payload data symbol of the plurality of payload data symbols. The variable d=k+i if k+i≤z. Further, the variable d=([k+i] mod z) if k+i>z. k is the symbol value of the i-th payload data symbol of the plurality of payload data symbols. z is the number of possible symbol values of the payload data symbols defined in the communication protocol, and 1≤i≤z.

The method 400 may allow to signal an additional bit without adding extra symbols to the communication protocol. Because of using the pulse length being longer than the maximum payload data symbol pulse length defined in the communication protocol for signaling the additional bit, the transmission of the additional bit is reliable.

More details and aspects of the method 400 are explained in connection with the proposed technique or one or more examples described above (e.g. FIGS. 1 and 3). The method 400 may comprise one or more additional optional features corresponding to one or more aspects of the proposed technique or one or more examples described above.

Figure 5:
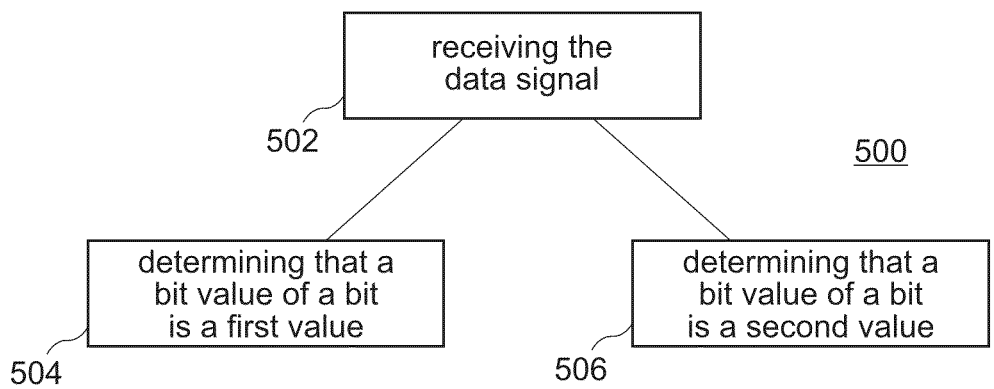
FIG. 5 illustrates a flowchart of an example of a method for decoding a data signal.

Further, FIG. 5 illustrates a flowchart of a method 500 for decoding a data signal comprising a plurality of pulses of variable pulse length at predetermined positions. The method 500 comprises receiving 502 the data signal. If the pulse lengths of the plurality of pulses at the predetermined positions are not longer than a maximum payload data symbol pulse length defined in the communication protocol, the method 500 comprises determining 504 that a bit value of a bit is a first value. If the pulse length of one of the plurality of pulses at the predetermined positions is longer than the maximum payload data symbol pulse length defined in the communication protocol, the method 500 comprises determining 506 that the bit value of the bit is a second value.

The method 500 may allow to reliably decode an additional bit in the data signal.

More details and aspects of the method 500 are explained in connection with the proposed technique or one or more examples described above (e.g. FIGS. 2 and 3). The method 500 may comprise one or more additional optional features corresponding to one or more aspects of the proposed technique or one or more examples described above.

The examples described herein may be summarized as follows:

Example 1 is an apparatus for transmitting a bit in addition to a plurality of payload data symbols of a communication protocol, the apparatus comprising: an input interface configured to receive information about a bit value of the bit; and a transmission circuit configured to: if the bit value is a first value, transmit the plurality of payload data symbols at predetermined positions in a data signal as pulses of variable pulse length, wherein the respective pulse length of each of the pulses is selected based on the symbol value of the payload data symbol represented by the respective pulse; and if the bit value is a second value, transmit a pulse exhibiting a pulse length being longer than a maximum payload data symbol pulse length defined in the communication protocol at the predetermined position of the pulse for the d-th payload data symbol of the plurality of payload data symbols, wherein d=k+i if k+i≤z, wherein d=([k+i] mod z) if k+i>z, wherein k is the symbol value of the i-th payload data symbol of the plurality of payload data symbols, wherein z is the number of possible symbol values of the payload data symbols defined in the communication protocol, and wherein 1≤i≤z.

Example 2 is the apparatus of example 1, wherein, if the bit value is the second value and if k=0, the transmission circuit is further configured to transmit the payload symbols of the plurality of payload data symbols other than the d-th payload data symbol as pulses of variable pulse length at their predetermined positions.

Example 3 is the apparatus of example 1 or example 2, wherein, if the bit value is the second value and if k>0, the transmission circuit is further configured to: transmit a pulse exhibiting a pulse length corresponding to the symbol value of the d-th payload data symbol at the predetermined position of the pulse for the i-th payload data symbol of the plurality of payload data symbols; and transmit the payload symbols of the plurality of payload data symbols other than the d-th payload data symbol and the i-th payload data symbol as pulses of variable pulse length at their predetermined positions.

Example 4 is the apparatus of any of examples 1 to 3, wherein the number of the plurality of payload data symbols is equal to the number of possible symbol values of the payload data symbols defined in the communication protocol.

Example 5 is the apparatus of any of examples 1 to 3, wherein the d-th payload data symbol of the plurality of payload data symbols is the d-th payload data symbol of the plurality of payload data symbols that is transmitted with a selected one of a high pulse and a low pulse, and wherein the i-th payload data symbol of the plurality of payload data symbols is the i-th payload data symbol of the plurality of payload data symbols that is transmitted with the selected one of the high pulse and the low pulse.

Example 6 is the apparatus of any of examples 1 to 5, wherein a sum of the pulse lengths of two directly succeeding pulses in the data signal that represent payload data symbols is lower than $10^{-7}$ s.

Example 7 is the apparatus of any of examples 1 to 6, wherein the transmission circuit is configured to transmit two directly succeeding payload data symbols of the plurality of payload data symbols as a sequence of a high pulse and a low pulse.

Example 8 is an apparatus for decoding a data signal comprising a plurality of pulses of variable pulse length at predetermined positions, the apparatus comprising: an input interface configured to receive the data signal; and a demodulation circuit configured to: if the pulse lengths of the plurality of pulses at the predetermined positions are not longer than a maximum payload data symbol pulse length defined in the communication protocol, determine that a bit value of a bit is a first value; and if the pulse length of one of the plurality of pulses at the predetermined positions is longer than the maximum payload data symbol pulse length defined in the communication protocol, determine that the bit value of the bit is a second value.

Example 9 is the apparatus of example 8, if the pulse length of one of the plurality of pulses at the predetermined positions is longer than the maximum payload data symbol pulse length defined in the communication protocol, the demodulation circuit is further configured to: determine a position m of the pulse with the pulse length being longer than the maximum payload data symbol pulse length defined in the communication protocol among the plurality of pulses; and determine that a symbol value of an i-th payload data symbol of a plurality of payload data symbols is ([m−i] mod z), wherein z is the number of possible symbol values of the payload data symbols defined in the communication protocol, and wherein 1≤i≤z.

Example 10 is the apparatus of example 9, wherein, if m=i, the demodulation circuit is further configured to: determine a respective symbol value for the other payload data symbols of the plurality of payload data symbols based on the respective pulse length of one of the pulses of the plurality of pulses other than the m-th pulse of the plurality of pulses.

Example 11 is the apparatus of example 9 or example 10, wherein, if m≠i, the demodulation circuit is further configured to: determine the symbol value of the m-th payload data symbol of the plurality of payload data symbols based on the pulse length of the i-th pulse of the plurality of pulses; and determine a respective symbol value for the payload data symbols of the plurality of payload data symbols other than the i-th payload data symbol and the m-th payload data symbol based on the respective pulse length of one of the pulses of the plurality of pulses other than the i-th pulse and the m-th pulse of the plurality of pulses.

Example 12 is the apparatus of any of examples 8 to 11, wherein the number of the plurality of pulses is equal to the number of possible symbol values of the payload data symbols defined in the communication protocol.

Example 13 is the apparatus of example 11, wherein the i-th pulse of the plurality of pulses is the i-th pulse of the plurality of pulses that is of the same pulse type as the m-th pulse of the plurality of pulses.

Example 14 is the apparatus of any of examples 8 to 13, wherein a sum of the pulse lengths of two directly succeeding pulses in the data signal that represent payload data symbols is lower than $10^{-7}$ s.

Example 15 is the apparatus of any of examples 8 to 14, wherein two pulses of the plurality of pulses representing two directly succeeding payload data symbols of the plurality of payload data symbols are a sequence of a high pulse and a low pulse.

Example 16 is the apparatus of any of examples 8 to 15, wherein, if the pulse lengths of the plurality of pulses at the predetermined positions are not longer than the maximum payload data symbol pulse length defined in the communication protocol, the demodulation circuit is configured to determine a respective symbol value for each payload data symbol of the plurality of payload data symbols based on the respective pulse length of a respective pulse of the plurality of pulses.

Example 17 is a method for transmitting a bit in addition to a plurality of payload data symbols of a communication protocol, the method comprising: receiving information about a bit value of the bit; if the bit value is a first value, transmitting the plurality of payload data symbols at predetermined positions in a data signal as pulses of variable pulse length, wherein the respective pulse length of each of the pulses is selected based on the symbol value of the payload data symbol represented by the respective pulse; and if the bit value is a second value, transmitting a pulse exhibiting a pulse length being longer than a maximum payload data symbol pulse length defined in the communication protocol at the predetermined position of the pulse for the d-th payload data symbol of the plurality of payload data symbols, wherein d=k+i if k+i≤z, wherein d=([k+i] mod z) if k+i>z, wherein k is the symbol value of the i-th payload data symbol of the plurality of payload data symbols, wherein z is the number of possible symbol values of the payload data symbols defined in the communication protocol, and wherein 1≤i≤z.

Example 18 is the method of example 17, wherein, if the bit value is the second value and if k=0, the method further comprises: transmitting the payload symbols of the plurality of payload data symbols other than the ([k+i] mod z)-th payload data symbol as pulses of variable pulse length at their predetermined positions.

Example 19 is the method of example 17 or example 18, wherein, if the bit value is the second value and if k>0, the method further comprises: transmitting a pulse exhibiting a pulse length corresponding to the symbol value of the d-th payload data symbol at the predetermined position of the pulse for the i-th payload data symbol of the plurality of payload data symbols; and transmitting the payload symbols of the plurality of payload data symbols other than the d-th payload data symbol and the i-th payload data symbol as pulses of variable pulse length at their predetermined positions.

Example 20 is the method of any of examples 17 to 19, wherein the number of the plurality of payload data symbols is equal to the number of possible symbol values of the payload data symbols defined in the communication protocol.

Example 21 is the method of any of examples example 17 to 19, wherein the d-th payload data symbol of the plurality of payload data symbols is the d-th payload data symbol of the plurality of payload data symbols that is transmitted with a selected one of a high pulse and a low pulse, and wherein the i-th payload data symbol of the plurality of payload data symbols is the i-th payload data symbol of the plurality of payload data symbols that is transmitted with the selected one of the high pulse and the low pulse.

Example 22 is the method of any of examples 17 to 21, wherein a sum of the pulse lengths of two directly succeeding pulses in the data signal that represent payload data symbols is lower than $10^{-7}$ s.

Example 23 is the method of any of examples 17 to 22, wherein two directly succeeding payload data symbols of the plurality of payload data symbols are transmitted as a sequence of a high pulse and a low pulse.

Example 24 is a method for decoding a data signal comprising a plurality of pulses of variable pulse length at predetermined positions, the method comprising: receiving the data signal; if the pulse lengths of the plurality of pulses at the predetermined positions are not longer than a maximum payload data symbol pulse length defined in the communication protocol, determining that a bit value of a bit is a first value; and if the pulse length of one of the plurality of pulses at the predetermined positions is longer than the maximum payload data symbol pulse length defined in the communication protocol, determining that the bit value of the bit is a second value.

Example 25 is the method of example 24, wherein, if the pulse length of one of the plurality of pulses at the predetermined positions is longer than the maximum payload data symbol pulse length defined in the communication protocol, the method further comprises: determining a position m of the pulse with the pulse length being longer than the maximum payload data symbol pulse length defined in the communication protocol among the plurality of pulses; and determining that a symbol value of an i-th payload data symbol of a plurality of payload data symbols is ([m−i] mod z), wherein z is the number of possible symbol values of the payload data symbols defined in the communication protocol, and wherein $1 \le i \le z$.

Example 26 is the method of example 25, wherein, if m=i, the method further comprises: determining a respective symbol value for the other payload data symbols of the plurality of payload data symbols based on the respective pulse length of one of the pulses succeeding the first pulse of the plurality of pulses.

Example 27 is the method of example 25 or example 26, wherein, if m≠i, the method further comprises: determining the symbol value of the m-th payload data symbol of the plurality of payload data symbols based on the pulse length of the i-th pulse of the plurality of pulses; and determining a respective symbol value for the payload data symbols of the plurality of payload data symbols other than the i-th payload data symbol and the m-th payload data symbol based on the respective pulse length of one of the pulses of the plurality of pulses other than the i-th pulse and the m-th pulse of the plurality of pulses.

Example 28 is the method of any of examples 25 to 27, wherein the number of the plurality of pulses is equal to the number of possible symbol values of the payload data symbols defined in the communication protocol.

Example 29 is the method of example 27, wherein the i-th pulse of the plurality of pulses is the i-th pulse of the plurality of pulses that is of the same pulse type as the m-th pulse of the plurality of pulses.

Example 30 is the method of any of examples 25 to 29, wherein a sum of the pulse lengths of two directly succeeding pulses in the data signal that represent payload data symbols is lower than $10^{-7}$ s.

Example 31 is the method of any of examples 25 to 30, wherein two pulses of the plurality of pulses representing two directly succeeding payload data symbols of the plurality of payload data symbols are a sequence of a high pulse and a low pulse.

Example 32 is the method of any of examples 25 to 31, wherein, if the pulse lengths of the plurality of pulses at the predetermined positions are not longer than the maximum payload data symbol pulse length defined in the communication protocol, the method comprises determining a respective symbol value for each payload data symbol of the plurality of payload data symbols based on the respective pulse length of a respective pulse of the plurality of pulses.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and nonvolatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for transmitting a bit in addition to a plurality of payload data symbols of a communication protocol, the apparatus comprising:
    an input interface configured to receive information about a bit value of the bit; and
    a transmission circuit configured to:
        if the bit value is a first value, transmit the plurality of payload data symbols at predetermined positions in a data signal as pulses of variable pulse length, wherein a respective pulse length of each of the pulses of variable pulse length is selected based on a symbol value of the payload data symbol represented by each pulse of variable pulse length; and
        if the bit value is a second value, transmit a pulse exhibiting an extended pulse length being longer than a maximum payload data symbol pulse length defined in the communication protocol at the predetermined position of the pulse for a d-th payload data symbol of the plurality of payload data symbols, wherein $d=k+i$ if $k+i \leq z$, wherein $d=([k+i] \bmod z)$ if $k+i>z$, wherein k is the symbol value of a i-th payload data symbol of the plurality of payload data symbols, wherein z is the number of possible symbol values of the payload data symbols defined in the communication protocol, and wherein $1 \leq i \leq z$.

2. The apparatus of claim 1, wherein, if the bit value is the second value and if $k=0$, the transmission circuit is further configured to transmit the payload symbols of the plurality of payload data symbols other than the d-th payload data symbol as pulses of variable pulse length at their predetermined positions.

3. The apparatus of claim 1, wherein, if the bit value is the second value and if $k>0$, the transmission circuit is further configured to:
    transmit a pulse exhibiting a concordant pulse length corresponding to the symbol value of the d-th payload data symbol at the predetermined position of the pulse for the i-th payload data symbol of the plurality of payload data symbols; and
    transmit the payload symbols of the plurality of payload data symbols other than the d-th payload data symbol and the i-th payload data symbol as pulses of variable pulse length at the predetermined positions.

4. The apparatus of claim 1, wherein the number of the plurality of payload data symbols is equal to the number of possible symbol values of the payload data symbols defined in the communication protocol.

5. The apparatus of claim 1, wherein the d-th payload data symbol of the plurality of payload data symbols is transmitted with a selected one of a high pulse and a low pulse, and wherein the i-th payload data symbol of the plurality of payload data symbols is transmitted with the selected one of the high pulse and the low pulse.

6. The apparatus of claim 1, wherein a sum of the pulse lengths of two directly succeeding pulses in the data signal that represent payload data symbols is lower than $10^{-7}$ s.

7. The apparatus of claim 1, wherein the transmission circuit is configured to transmit two directly succeeding payload data symbols of the plurality of payload data symbols as a sequence of a high pulse and a low pulse.

8. An apparatus for decoding a data signal comprising a plurality of pulses of variable pulse length at predetermined positions, the apparatus comprising:
    an input interface configured to receive the data signal; and
    a demodulation circuit configured to:
        if a respective pulse length of each of the plurality of pulses at the predetermined positions are not longer than a maximum payload data symbol pulse length defined in a communication protocol, determine that a bit value of a bit is a first value; and
        if the respective pulse length of one of the plurality of pulses at the predetermined positions is longer than a maximum payload data symbol pulse length defined in the communication protocol,
            determine that the bit value of the bit is a second value;
            determine a position m of the pulse with the pulse length being longer than the maximum payload data symbol pulse length defined in the communication protocol among the plurality of pulses; and
            determine that a symbol value of an i-th payload data symbol of a plurality of payload data symbols is $([m-i] \bmod z)$, wherein z is the number of possible symbol values of the payload data symbols defined in the communication protocol, and wherein $1 \leq i \leq z$.

9. The apparatus of claim 8, wherein, if m=i, the demodulation circuit is further configured to:
determine a respective symbol value for the other payload data symbols of the plurality of payload data symbols based on the respective pulse length of one of the pulses of the plurality of pulses other than an m-th pulse of the plurality of pulses.

10. The apparatus of claim 8, wherein, if m≠i, the demodulation circuit is further configured to:
determine the symbol value of an m-th payload data symbol of the plurality of payload data symbols based on the pulse length of an i-th pulse of the plurality of pulses; and
determine a respective symbol value for the payload data symbols of the plurality of payload data symbols other than the i-th payload data symbol and the m-th payload data symbol based on the respective pulse length of one of the pulses of the plurality of pulses other than the i-th pulse and an m-th pulse of the plurality of pulses.

11. The apparatus of claim 8, wherein the number of the plurality of pulses is equal to the number of possible symbol values of the payload data symbols defined in the communication protocol.

12. The apparatus of claim 10, wherein the i-th pulse of the plurality of pulses is the i-th pulse of the plurality of pulses that is of the same pulse type as the m-th pulse of the plurality of pulses.

13. The apparatus of claim 8, wherein a sum of the pulse lengths of two directly succeeding pulses in the data signal that represent payload data symbols is lower than $10^{-7}$ s.

14. The apparatus of claim 8, wherein two pulses of the plurality of pulses representing two directly succeeding payload data symbols of the plurality of payload data symbols are a sequence of a high pulse and a low pulse.

15. The apparatus of claim 8, wherein, if the pulse lengths of the plurality of pulses at the predetermined positions are not longer than the maximum payload data symbol pulse length defined in the communication protocol, the demodulation circuit is configured to determine a respective symbol value for each payload data symbol of the plurality of payload data symbols based on the respective pulse length of each pulse of the plurality of pulses.

16. A method for transmitting a bit in addition to a plurality of payload data symbols of a communication protocol, the method comprising:
receiving information about a bit value of the bit;
if the bit value is a first value, transmitting the plurality of payload data symbols at predetermined positions in a data signal as pulses of variable pulse length, wherein a respective pulse length of each of the pulses of variable pulse length is selected based on the symbol value of the payload data symbol represented by each pulse of variable pulse length; and
if the bit value is a second value, transmitting a pulse exhibiting an extended pulse length being longer than a maximum payload data symbol pulse length defined in the communication protocol at the predetermined position of the pulse for a d-th payload data symbol of the plurality of payload data symbols, wherein d=k+i if k+i≤z, wherein d=([k+i] mod z) if k+i>z, wherein k is the symbol value of a i-th payload data symbol of the plurality of payload data symbols, wherein z is the number of possible symbol values of the payload data symbols defined in the communication protocol, and wherein $1 \leq i \leq z$.

17. The method of claim 16, wherein, if the bit value is the second value and if k=0, the method further comprises:
transmitting the payload symbols of the plurality of payload data symbols, other than a ([k+i] mod z)-th payload data symbol, as pulses of variable pulse length at the predetermined positions.

18. The method of claim 16, wherein, if the bit value is the second value and if k>0, the method further comprises:
transmitting a pulse exhibiting a concordant pulse length corresponding to the symbol value of the d-th payload data symbol at the predetermined position of the pulse for the i-th payload data symbol of the plurality of payload data symbols; and
transmitting the payload symbols of the plurality of payload data symbols other than the d-th payload data symbol and the i-th payload data symbol as pulses of variable pulse length at the predetermined positions.

19. The method of claim 16, wherein the number of the plurality of payload data symbols is equal to the number of possible symbol values of the payload data symbols defined in the communication protocol.

20. A method for decoding a data signal comprising a plurality of pulses of a variable pulse length at predetermined positions, the method comprising:
receiving the data signal;
if a respective pulse length of each of the plurality of pulses at the predetermined positions are not longer than a maximum payload data symbol pulse length defined in a communication protocol, determining that a bit value of a bit is a first value; and
if the respective pulse length of one of the plurality of pulses at the predetermined positions is longer than a maximum payload data symbol pulse length defined in the communication protocol,
determining that the bit value of the bit is a second value;
determining a position m of the pulse with the pulse length being longer than the maximum payload data symbol pulse length defined in the communication protocol among the plurality of pulses; and
determining that a symbol value of an i-th payload data symbol of a plurality of payload data symbols is ([m−i] mod z), wherein z is the number of possible symbol values of the payload data symbols defined in the communication protocol, and wherein $1 \leq i \leq z$.

21. The method of claim 20, wherein, if m=i, the method further comprises:
determining a respective symbol value for the other payload data symbols of the plurality of payload data symbols based on the respective pulse length of one of the pulses succeeding a first pulse of the plurality of pulses.

22. The method of claim 20, wherein, if m≠i, the method further comprises:
determining the symbol value of an m-th payload data symbol of the plurality of payload data symbols based on the pulse length of an i-th pulse of the plurality of pulses; and
determining a respective symbol value for the payload data symbols of the plurality of payload data symbols other than the i-th payload data symbol and the m-th payload data symbol based on the respective pulse length of one of the pulses of the plurality of pulses other than the i-th pulse and an m-th pulse of the plurality of pulses.

23. The method of claim 20, wherein, if the pulse lengths of the plurality of pulses at the predetermined positions are not longer than the maximum payload data symbol pulse length defined in the communication protocol, the method comprises determining a respective symbol value for each payload data symbol of the plurality of payload data symbols based on the respective pulse length of each pulse of the plurality of pulses.

* * * * *